(12) United States Patent
Paz

(10) Patent No.: US 8,559,512 B2
(45) Date of Patent: Oct. 15, 2013

(54) DEVICE, SYSTEM, AND METHOD FOR PREDICTING RESIDUAL DATA FOR INTRA AND INTER FRAME ENCODING OF IMAGE OR VIDEO DATA

(75) Inventor: Adar Paz, Kefar-Sava (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 554 days.

(21) Appl. No.: 12/845,857

(22) Filed: Jul. 29, 2010

(65) Prior Publication Data

US 2011/0274170 A1 Nov. 10, 2011

Related U.S. Application Data

(63) Continuation-in-part of application No. 12/774,087, filed on May 5, 2010.

(51) Int. Cl.
*H04N 11/02* (2006.01)
*H04N 11/04* (2006.01)
*G06K 9/46* (2006.01)

(52) U.S. Cl.
USPC ............ 375/240.13; 375/240.12; 375/240.24; 382/238

(58) Field of Classification Search
None
See application file for complete search history.

(56) References Cited

U.S. PATENT DOCUMENTS

| 8,325,804 | B2 | 12/2012 | Haddad et al. |
| 2007/0133891 | A1 | 6/2007 | Jeong |
| 2009/0097558 | A1* | 4/2009 | Ye et al. .................. 375/240.13 |
| 2009/0110070 | A1 | 4/2009 | Takahashi et al. |
| 2009/0225834 | A1 | 9/2009 | Song et al. |
| 2009/0225847 | A1* | 9/2009 | Min et al. .................. 375/240.16 |
| 2009/0268974 | A1 | 10/2009 | Takagi |
| 2010/0128995 | A1 | 5/2010 | Drugeon et al. |

OTHER PUBLICATIONS

U.S Office action for U.S. Appl. No. 12/774,087 dated Aug. 9, 2012.
U.S. Office Action for U.S. Appl. No. 12/774,087 dated Feb. 7, 2012.
Harald Jordan et al. Runtime-Optimised Intra-4x4 Mode-Decision for H.264/AVC Video Encoding Proceedings of the 6$^{th}$ International Symposium on Image and Signal Processing and Analysis (Dec. 2009) pp. 227-232 Vienna, Austria.
Jun Sung Park et al. Selective Intra Prediction Mode Decision for H.264/AVC Encoders Transactions on Engineering, Computing and Technology, vol. 13, May 2006, pp. 51-55.

(Continued)

*Primary Examiner* — Joseph Ustaris
*Assistant Examiner* — Frederick Bailey
(74) *Attorney, Agent, or Firm* — Pearl Cohen Zedek Latzer, LLP

(57) ABSTRACT

A system, processor, and method are provided for encoding a data block, for example, of digital data. A processor may, from among a plurality of intra frame encoding modes each having a different direction for extrapolating already encoded pixels adjacent to the block, select an intra coding mode having a direction that most closely matches a direction of minimum pixel value change of the block. The processor may compute a predicted intra frame encoding residual data for the block associated with the selected mode based on the difference between the direction of the selected intra frame encoding mode and the direction of minimum pixel value change of the block. The processor may compute inter frame encoding residual data and compare the intra and inter frame encoding residual data. The processor may compress the data block using the intra or inter frame encoding having the smaller residual data.

20 Claims, 9 Drawing Sheets

(56) References Cited

OTHER PUBLICATIONS

Sairam et al. A Novel Partial Prediction Algorithm for Fast 4x4 Intra Prediction Mode Decision in J.264/AVC Data Compression Conference, pp. 232-231 IEEE 2008.

Thomas Wiegand et al. Overview of the H.264/AVC Video Coding Standard IEEE Transactions on Circuits and Systems for Video Technology, vol. 13 No. 7, Jul. 2003 pp. 560-576.

U.S Office action for U.S. Appl. No. 12/774,087 dated Apr. 1, 2013.

\* cited by examiner

Mode Direction

DEVICE, SYSTEM, AND METHOD FOR PREDICTING RESIDUAL DATA FOR INTRA AND INTER FRAME ENCODING OF IMAGE OR VIDEO DATA

RELATED APPLICATION DATA

The present application is a continuation-in-part of prior application Ser. No. 12/774,087, filed on May 5, 2010, entitled "DEVICE, SYSTEM, AND METHOD FOR SPATIALLY ENCODING VIDEO DATA," incorporated by reference herein in its entirety.

BACKGROUND

The present invention relates to video and image applications, and more particularly to encoding a block of pixels, for example, in video and imaging applications.

Many different video compression mechanisms have been developed for effectively transmitting and storing digital video and image data. Compression mechanisms may use an "inter" frame encoding mode to encode temporal changes between corresponding pixels in consecutive frames and/or an "intra" coding mode to encode spatial changes between adjacent pixels within a single frame.

Inter coding modes take advantage of the fact that consecutive frames in a typical video sequence are often very similar to each other. For example, a sequence of frames may have scenes in which an object moves across a stationary background, or a background moves behind a stationary object. Intra coding modes take advantage of the correlation among adjacent pixels by extrapolating similar adjacent pixels to reduce spatial redundancies in video and image data. The respective intra (spatial) and inter (temporal) coding modes may be used together or separately to reduce the temporal and spatial redundancies in video data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

Figure 1A:
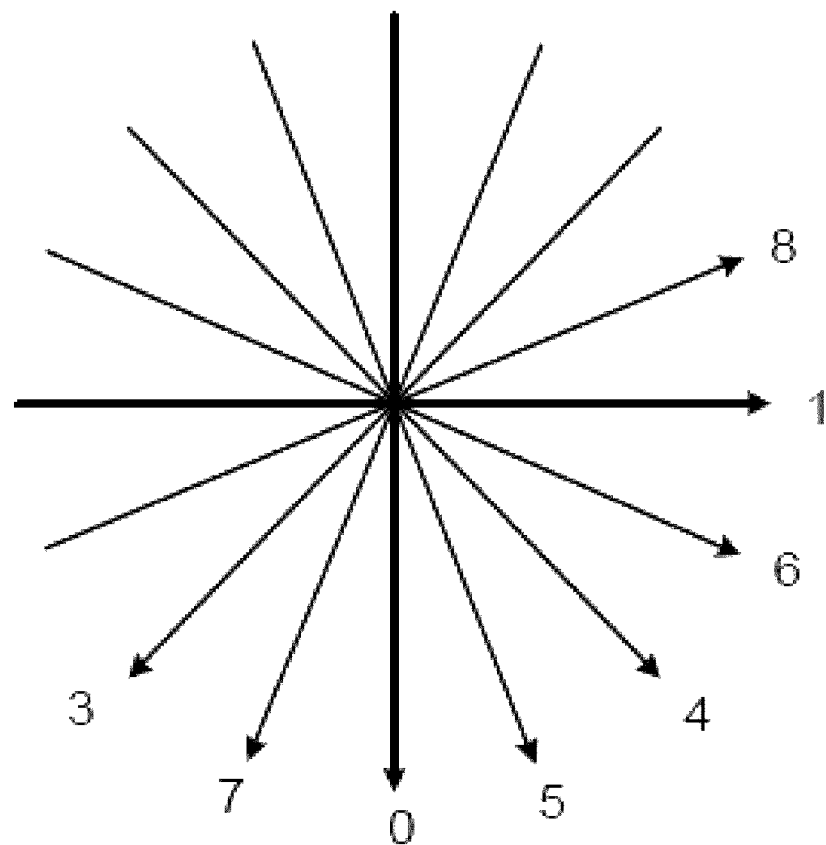
FIGS. 1A and 1B shows a plurality of possible intra encoding modes helpful in understanding embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

An image or frame may be partitioned into macro blocks. A macro block may be a 16×16 data block (representing values for a 16×16 pixel array), which may be further partitioned into 16 sub-macro or 4×4 blocks (each representing values for a 4×4 pixel array). Other block sizes or arrangements may be used. In some standards, there are a plurality of different coding modes from which to choose for encoding each (e.g., 4×4) data block.

Intra (spatial) encoding modes encode a data block using spatially adjacent reference blocks in the same image frame, while inter (temporal) encoding modes encode a data block using reference blocks from a previously-encoded reference frame. Each intra and inter encoding modes may include a plurality of sub-modes from which to choose for encoding each data block.

Figure 1B:
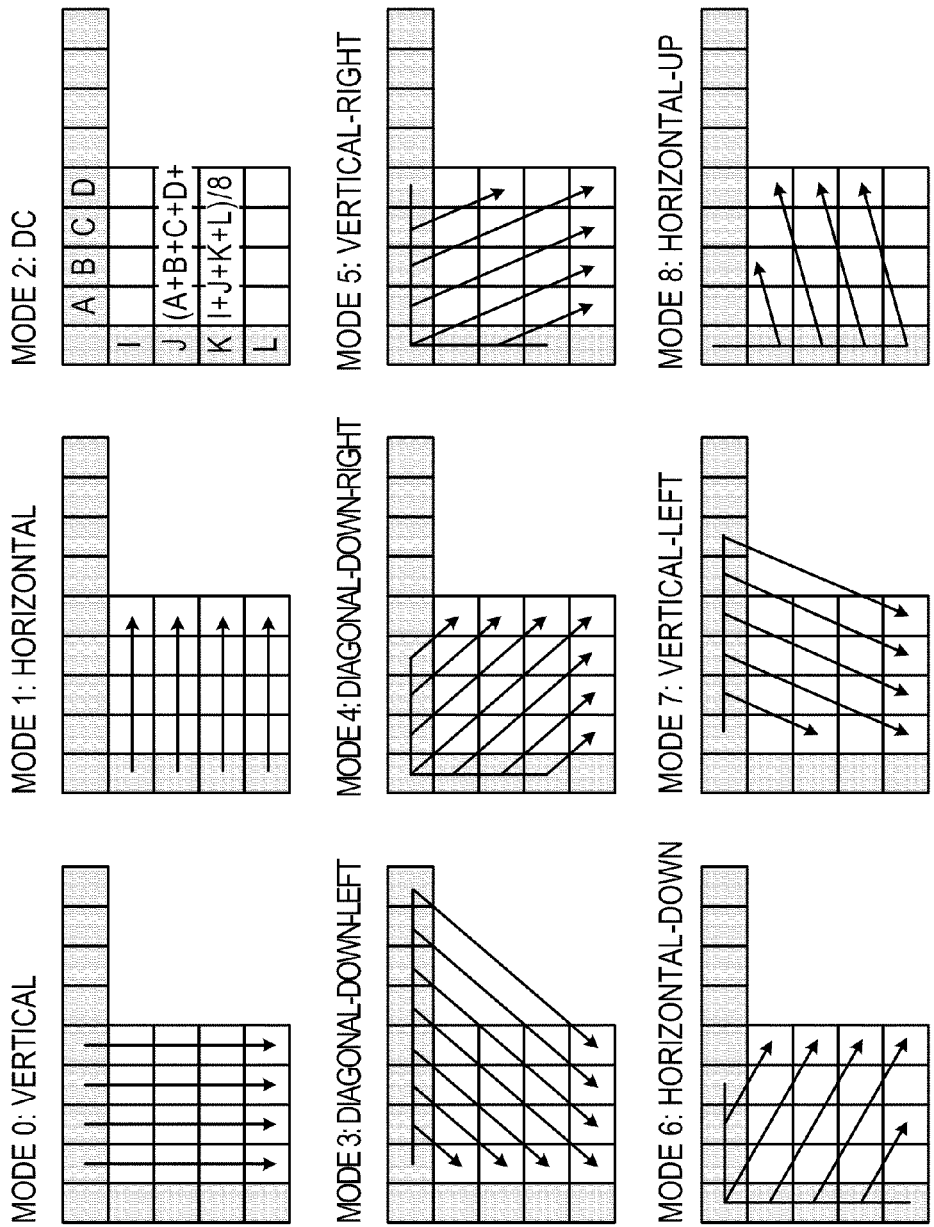

Reference is made to FIGS. 1A and 1B, which shows a plurality of alternative possible intra coding modes helpful in understanding embodiments of the invention. The example in the figure shows the nine different intra coding modes (0)-(8) in the H.264/Advanced Video Coding (AVC) standard for encoding 4×4 data blocks, which are listed for example, as follows:

| Intra4x4PredMode [luma4x4BlkIdx] | Name of Intra4x4PredMode[luma4x4BlkIdx] |
|---|---|
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |

In the figures, there are eight directional modes (e.g., modes 0-1 and 3-8) and one non-directional mode (e.g., mode 2). Each directional intra coding mode may correspond to a different spatial direction for encoding pixel value changes in their respective directions, for example, as shown in the "Mode Direction" diagram of FIG. 1A. These directional intra coding modes extrapolate texture patterns in their respective directions using already encoded adjacent pixels, for example, as shown in the "Pixel Extrapolation" diagrams of FIG. 1B. Each non-directional intra coding mode may correspond to a specific predetermined spatial pattern for encoding pixel value changes (the pattern having no predominant or specific spatial direction). In one example, the predetermined spatial pattern of the non-directional "Mode 2: DC" of FIG. 1B may be the average of (8) pixel values in the row segment above and the column segment to the left of each (4×4) data block.

For a plurality of alternative possible modes for inter frame encoding, each different mode may indicate a different previously encoded reference frame or a different absolute or relative position of or between a reference block or prediction block (for encoding) and the current data block in a current frame (to be encoded). The reference blocks in the reference frame(s) and the current block in the current frame may have the same position in the respective frames or different positions (for motion-compensation). Inter frame encoders may use a block matching algorithm to identify the one or more reference block(s) that most closely match the current data block. The inter frame encoders may choose from up to, for example, (16) reference frames or (32) reference fields for interlaced encoding in the H.264/AVC standard for encoding (4×4) data blocks, although any other numbers of reference frames or reference fields may be used.

To find the optimal encoding mode for each data block, an encoder may test each of the plurality of intra encoding modes and each of the plurality of inter encoding modes to determine which of the inter or intra coding modes is the best mode to encode the data block. Each encoding mode may result in a different encoding quality. To choose the optimal encoding mode and generate the optimal encoding quality, each coding mode may be tested.

To test encoding quality, a "prediction block" may be generated for each intra and inter mode approximating the currently-encoded data block by extrapolating already encoded pixels. An intra encoder may extrapolate pixels adjacent to the current block in the same frame to replicate the block in the mode direction, for example, as shown in FIG. 1A (or as an average of adjacent pixels for non-directional mode(s)). An inter encoder may extrapolate pixels from similar data blocks in different already encoded reference frames, for example, in the same location or translated in a direction of picture motion to replicate the movement of the reference block between the frames.

To judge the quality of the coding mode, the encoder may compute the differences or "residual data" between the predicted block and the original uncompressed data block, for example, as the Sum of Absolute Differences (SAD) between the blocks. The optimal mode may be the mode that generates the most accurate prediction block and therefore has the minimum residual data (for example, the smallest SAD). To find this "optimal" mode, the residual data for each alternative coding mode may be calculated (e.g., nine alternative mode calculations for intra coding and a plurality of alternative mode calculations for inter coding, generally varying depending on the type of mode, in the H.264 standard). This is referred to as the "mode-decision" operation. The mode-decision operation may be computationally intensive and typically represents the bottleneck in most encoder systems.

Embodiments of the invention may improve the efficiency of encoding image or video data, the mode-decision operation, and specifically, predicting the optimal one of a plurality of possible intra and inter coding modes to encode each data block.

In one embodiment of the invention, a mode decision unit may replace the conventional mode-decision operation, in which an optimal encoding mode is chosen by computing the encoded (prediction) block and calculating the residual data between the prediction block and the original uncompressed data block for each mode separately—a time consuming operation, with a new optimized mode-decision operation, in which an optimal mode is chosen by predicting the residual data without actually computing the prediction block for at least a plurality of different modes. The residual data for a mode may be any measure of the accuracy (or inaccuracy) of the data encoded by that mode to resemble the original uncompressed data, for example, including difference value(s), prediction error, sum of absolute difference (SAD), mean-square error (MSE), etc., between the encoded and original uncompressed (non-encoded) data blocks.

In one embodiment of the invention, the optimal intra encoding mode for each data block may be chosen by calculating the direction of minimum pixel change between the current data block and previously encoded adjacent pixels. The direction of minimum pixel change has the greatest spatial redundancy and is therefore the preferred direction for extrapolating the adjacent pixels for intra (spatial) encoding. Calculating the direction of minimum pixel change to determine which of the intra coding modes is preferred is significantly less time consuming than generating a prediction block and calculating the associated residual data for every possible mode.

To predict the accuracy (or error) of using the selected optimal intra coding mode (without actually executing encoding steps to generate the prediction block and measure its error or residual data), the optimized mode-decision operation may calculate a difference between the direction of minimal pixel value change (for example, the most spatially redundant and therefore preferred direction for pixel extrapolation) and the direction of the intra coding mode closest thereto. This difference between the predominant direction of actual spatial redundancies in a current data block and the closest intra mode direction corresponds (for example, linearly) to the difference or residual data between the current data block and the data block encoded in the closest intra mode direction. That is, a mode for which this difference is smaller may be estimated to have less residual data and therefore, may be predicted to represent the original data block with relatively better accuracy, as compared to a mode having a greater difference.

Once the residual data for intra encoding modes is predicted, the encoder may compare the intra encoding residual data with the inter coding residual data to determine whether the intra or inter coding modes are preferred. In one embodiment, the inter encoding residual data may be actual residual data, for example, measured (not predicted) by generating a prediction block using the inter coding mode and measuring the difference between the prediction block and the current data block to be encoded. Alternatively, the inter encoding residual data may be predicted (estimated) residual data, for example, generated without computing a prediction block. In one embodiment, the residual data for inter encoding modes may be predicted by measuring the difference between the direction of minimal pixel value change and the direction of the intra coding mode closest thereto, separately, for each of the current block in the current frame and a matching block in a reference frame. The predicted residual data for inter encoding modes may be the sum of the respective differences for the current block and matching reference block. In various embodiments only one or both of the inter and intra coding residual data may be predicted (estimated).

Predicting the residual data of intra encoding for each data block by calculating spatial redundancies across an image is significantly less time consuming than actually encoding each data block and calculating the difference between the original and encoded data blocks. Accordingly, the mode decision unit using the mode-decision operation optimized according to embodiments of the invention may significantly increase coding efficiency.

Figure 2A:
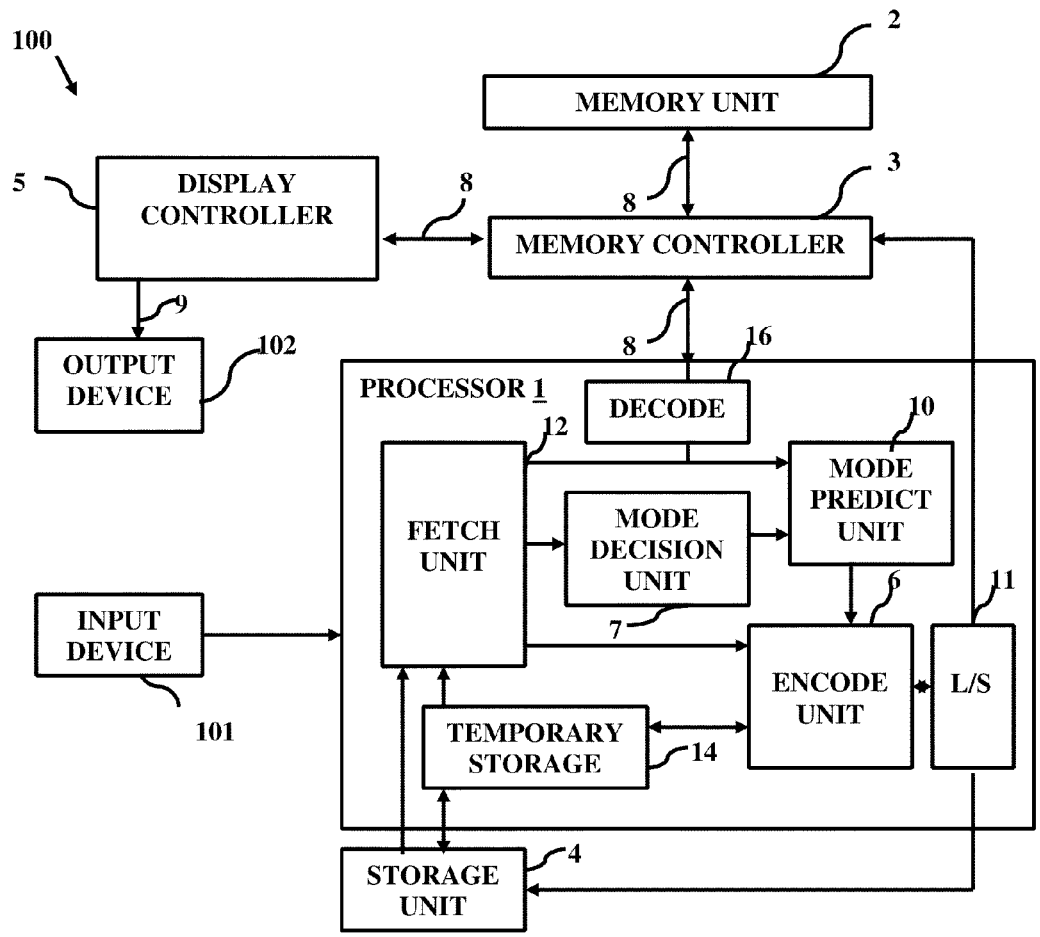
FIG. 2A is a schematic illustration of an exemplary device in accordance with embodiments of the invention.

Reference is made to FIG. 2A, which is schematic illustration of an exemplary device in accordance with embodiments of the invention.

Device 100 may be a computer device, video or image capture or playback device, cellular device, or any other digital device such as a cellular telephone, personal digital assistant (PDA), video game console, etc. Device 100 may include any device capable of executing a series of instructions to record, save, store, process, edit, display, project, receive, transfer, or otherwise use or manipulate video or image data. Device 100 may include an input device 101. When device 100 includes recording capabilities, input device 101 may include an imaging device such as a camcorder including an imager, one or more lens(es), prisms, or mirrors, etc. to capture images of physical objects via the reflection of light waves therefrom and/or an audio recording device including an audio recorder, a microphone, etc., to record the projection of sound waves thereto.

When device 100 includes image processing capabilities, input device 101 may include a pointing device, click-wheel or mouse, keys, touch screen, recorder/microphone using voice recognition, other input components for a user to control, modify, or select from video or image processing operations. Device 100 may include an output device 102 (for example, a monitor, projector, screen, printer, or display) for displaying video or image data on a user interface according to a sequence of instructions executed by processor 1.

An exemplary device 100 may include a processor 1. Processor 1 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 100 may include a data memory unit 2 and a memory controller 3. Memory controller 3 may control the transfer of data into and out of processor 1, memory unit 2, and output device 102, for example via one or more data buses 8. Device 100 may include a display controller 5 to control the transfer of data displayed on output device 102 for example via one or more data buses 9.

Device 100 may include a storage unit 4. Data memory unit 2 may be a short-term memory unit, while storage unit 4 may be a long-term memory unit. Storage unit may include one or more external drivers, such as, for example, a disk or tape drive or a memory in an external device such as the video, audio, and/or image recorder. Data memory unit 2 and storage unit 4 may include, for example, random access memory (RAM), dynamic RAM (DRAM), flash memory, cache memory, volatile memory, non-volatile memory or other suitable memory units or storage units. Data memory unit 2 and storage unit 4 may be implemented as separate (for example, "off-chip") or integrated (for example, "on-chip") memory units. In some embodiments in which there is a multi-level memory or a memory hierarchy, storage unit 4 may be off-chip and data memory unit 2 may be on-chip. For example, data memory unit 2 may include an L-1 cache or an L-2 cache. An L-1 cache may be relatively more integrated with processor 1 than an L-2 cache and may run at the processor clock rate whereas an L-2 cache may be relatively less integrated with processor 1 than the L-1 cache and may run at a different rate than the processor clock rate. In one embodiment, processor 1 may use a direct memory access (DMA) unit to read, write, and/or transfer data to and from memory units, such as data memory unit 2 and/or storage unit 4. Other or additional memory architectures may be used.

Storage unit 4 may store video or image data in a compressed form, while data memory unit 2 may store video or image data in a uncompressed form; however, either compressed or uncompressed data may be stored in either memory unit and other arrangements for storing data in a memory or memories may be used. Uncompressed data may be represented in a multi-dimensional data array (for example, a two or three dimensional array of macro blocks), while compressed data may be represented as a one-dimensional data stream or data array. Each uncompressed data element may have a value uniquely associated with a single pixel in an image or video frame (for example, a 16×16 macro block may represent a 16×16 pixel array), while compressed data elements may represent a variation or change in pixel values. Compressed data from inter frame coding mechanisms may indicate a temporal change between the values of corresponding pixels in consecutive (or chronological) frames in a video stream. Compressed data from intra frame coding mechanisms may indicate a spatial change in values between adjacent pixels in a single image frame. Typically, intra frame encoding compresses each (e.g., 4×4) data block in a (e.g., 16×16) macro block independently (using a unique intra coding mode or at least evaluated independently for selecting the intra coding mode), while inter frame encoding compresses each macro block as a whole (using a single inter coding mode for the entire macro block). However, either inter or intra frame encoders may operate on one or more macro blocks or sub-macro-blocks.

Processor 1 may include a fetch unit 12, a mode decision unit 7, a mode prediction unit 10, and an encode unit 6.

To encode or compress video or image data, processor 1 may send a request to retrieve uncompressed data from data memory unit 2. The uncompressed data may include macro blocks (e.g., representing 16×16 pixel arrays) divided into sub-macro blocks (e.g., representing 4×4 pixel arrays). Processor 1 may indicate a specific memory address for retrieving each uncompressed data block or may simply request the next sequentially available data. Fetch unit 12 may retrieve or fetch the uncompressed data from data memory unit 2, for example, as individual pixel values, in data blocks, or in "bursts." A burst may include data across a single row of pixels. Since each (e.g., 4×4) data block spans multiple (e.g., four) rows, processor 1 may retrieve multiple (e.g., four) bursts in order to form a complete (e.g., 4×4) data block. Other numbers, arrangements, sizes and types of data or data blocks may be used, for example, including 4×8, 8×4, 4×16, 8×16, 16×16, . . . data blocks, a one-dimensional string of data bits, or three-dimensional data arrays. The uncompressed data may be stored in temporary storage unit 14, which may be, for example, a buffer or cache memory.

In conventional systems, a mode prediction unit may select the intra coding mode by repeatedly running the same mode prediction operations on a data block for each and every possible mode. For each mode, the mode prediction operations for each data block may include (a) generating a "prediction block" approximating the data block by applying the mode directional vector to already encoded pixels surrounding the data block, then (b) measuring the "actual" (not predicted) difference or residual data between the predicted block and the original uncompressed data block, and finally (c) comparing the actual residual data for the current mode with the residual data for other modes. The most accurate of the plurality of possible modes is the one mode which generates a prediction block most similar to the actual data block, i.e., which has the smallest residual data. For example, if the mode perfectly encodes the data block, the residual data may be zero. Thus, the mode that generates the smallest residual data may be selected to encode the data block. These mode prediction operations (a)-(c) are time consuming, especially when executed for every possible intra coding mode (for example, nine modes in the H.264/AVC standard). This process is repetitive, inefficient, and is typically the bottleneck of conventional intra mode encoding.

According to embodiments of the invention, the optimal intra coding mode may be determined without using mode prediction operations (a)-(c) or mode prediction unit 10, and instead, using mode decision unit 7.

Each data block may be encoded by extrapolating or copying pixel values from already encoded adjacent pixels to generate a prediction block. Each intra coding mode defines a distinct direction in which the pixel values are copied (for example, as shown in FIG. 1A). Mode decision unit 7 may use a unique criterion, for example, the spatial direction of minimum pixel value change for each data block, to select the optimal mode to encode the data block. The direction of minimum value change has the most redundant and similar pixel values and is therefore the optimal direction across which to copy adjacent pixel values. Mode decision unit 7 may select the mode that most closely corresponds to that direction. It is that mode that may generate the most accurate predicted block with the smallest residual data. Any other directions (corresponding to other modes) would copy the same pixel values in a direction having less constant and more deviating pixel values. These other modes would thereby generate a prediction block that, on average, has a greater deviation in pixel values from the original uncompressed data block.

Once the optimal intra coding mode is selected for one or more data blocks, mode decision unit 7 may predict the error or residual data of using that intra mode to encode the data blocks. Mode decision unit 7 may calculate a difference between the direction of minimal pixel value change for the one or more data block(s) and the direction(s) of the selected optimal intra coding mode(s) closest thereto. A new property has been observed, finding a (first order) linear relationship between the residual data (for example, the SAD) of a prediction data block for each mode and the difference between the direction of minimum pixel value change in the data block and the direction of that mode. Accordingly, mode decision unit 7 may predict the residual data of intra coding without using mode prediction unit 10 to actually generate each predicted block and measure its residual data.

The predicted residual data for intra frame encoding, $PRD_{Intra}$, for one or more (n) data blocks may be defined, for example, as follows:

$$PRD_{Intra} = \left( \sum_n (\text{direction of min pixel change}) - (\text{closet mode direction}) \right) * (p) + (q), \quad (1)$$

where parameters (p) and (q) are scalar values defining a linear (first order) relationship between the residual data using the optimal intra coding mode(s) and the difference between the direction of minimum pixel value change in the original one or more (n) data block(s) and the closest of the intra mode directions (the direction of the optimal selected intra coding mode(s)) for each of the (n) data blocks. In one example, parameters (p) and (q) may have values determined through experimentation to optimize the prediction accuracy (for example, for the predicted residual data, $PRD_{Intra}$, to be as close as possible to the actual residual data). In one example, parameter (p) is 0.8 and parameter (q) is 653, although other values may be used.

In one embodiment, intra frame encoding may compress sub-macro blocks (e.g., 4×4 data blocks) independently and inter frame encoding may compress macro blocks (e.g., 16×16 data blocks) as a whole (using a single inter coding mode for the entire macro block). To compare the intra or inter coding, mode decision unit 7 may evaluate the residual data measured by inter mode encoding for a macro block with the cumulative predicted residual data for intra mode encoding for each sub-macro block combined in the set of blocks corresponding to the macro block. The individual mode selected for each individual (4×4) data blocks is combined or added in equation (1) to generate a cumulative predicted residual error for the group of data blocks forming a complete macro block. The predicted residual data, $PRD_{Intra}$, is a function of the difference between the direction of minimal pixel value change for each data block and the direction of the selected optimal intra coding mode closest thereto, combined for all data blocks in each group or macro block. In an alternative embodiment, inter coding modes may be independently selected for each sub-macro block, predicted residual data may be independently computed for each sub-macro block, and the comparison between inter and intra coding modes may be evaluated independently for each sub-macro block. Any size (m×n) sub-macro block and (r×s) macro block may be used, where m, n, r, and s are positive integers.

Once the optimal intra coding residual error is predicted, mode decision unit 7 may compare the predicted residual data for intra coding, $PRD_{Intra}$, with the (actual or measured) residual data for inter coding, $RD_{Inter}$. If $PRD_{Intra}$ is smaller than $RD_{Inter}$, the mode decision unit 7 may select the (optimal) intra coding mode(s) to encode the one or more evaluated data blocks. However, if $PRD_{Intra}$ is greater than $RD_{Inter}$, the mode decision unit 7 may select the (optimal) inter coding mode(s) to encode the one or more evaluated data blocks.

Mode decision unit 7 may issue the data block(s) to be encoded and the selected mode(s) to mode prediction unit 10. Mode prediction unit 10 may perform operations (a) and (b) on the data block(s) using the intra or inter coding mode selected by mode decision unit 7. For example, mode prediction unit 10 may generate a prediction block using already encoded pixels in the spatial proximity of the current data block if the intra coding mode is selected and from a corresponding data block of a previously encoded frame if the inter coding mode is selected.

If intra coding modes are selected and only a prediction (not an actual measurement) of the residual data has been generated to select the encoding mode, mode prediction unit 10 may compute the actual measured residual data between the predicted block and the original uncompressed data block to encode the data. In an alternate embodiment, the predicted residual data may be used in place of the actual residual data for intra mode encoding. However, if inter coding modes are selected, an actual measurement of the residual encoding error has already been computed for evaluating the modes and mode prediction unit 10 need not re-compute the residual data. In general, where intra or inter coding residual data may be either measured (using prediction blocks) or predicted/estimated (without using prediction blocks), mode prediction unit 10 may generate a prediction block and compute the actual measured residual data thereof for the encoding modes for which predicted (and not measured) residual data has been generated.

Since the residual data for intra encoding is only predicted (not measured) for determining which mode to use for encoding, if the inter coding mode is selected instead, embodiments of the invention may compress the data blocks without wasting resources on actually generating and evaluating intra mode prediction blocks and residual data, which would never be used for encoding.

As compared with conventional mechanisms, which repeatedly execute mode prediction operations (a)-(c) on a data block for each and every inter and intra coding mode to select the optimal mode (e.g., 9 times for each intra mode and 16 or 32 times for each inter coding mode in the H.264/AVC standard), according to embodiments of the invention, mode prediction unit 10 only executes mode prediction operations (a)-(c) for inter coding modes but not for the (nine) intra coding modes, providing a 9-fold increase in the efficiency of the mode prediction operations in the H.264/AVC standard, the most time-consuming operation of the coding process. Mode prediction unit 10 may only execute operations (a)-(c) for inter coding modes and operations (a) and (b) for a single intra coding mode (only if the intra mode is selected for encoding). To further distinguish conventional mechanisms, when mode prediction operations (a) and (b) are executed on the selected intra coding mode, they are not used to select the mode (the mode is already selected), but simply to generate residual data for encoding the data blocks.

Figure 2B:
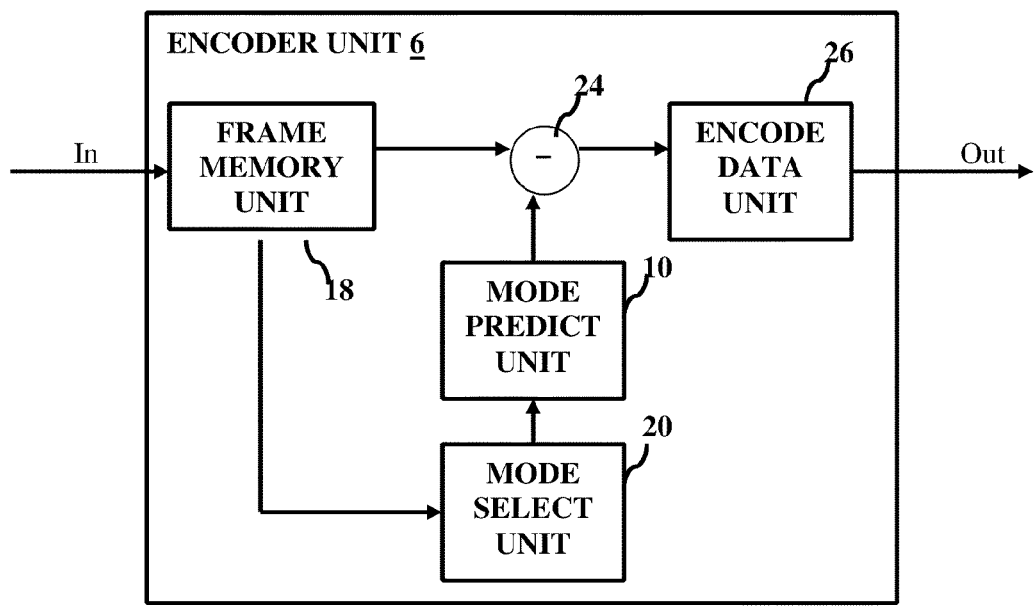
FIG. 2B is a schematic illustration of an exemplary encoder unit in accordance with embodiments of the invention.

Reference is made to FIG. 2B, which is schematic illustration of an exemplary encoder unit 6, in accordance with embodiments of the invention. Encoder unit 6 may receive input data for each data block including, for example, image data (e.g., from temporary storage 14 or directly from fetch unit 12), the corresponding selected intra or inter coding mode (e.g., from mode decision unit 7), and the residual data generated only for the inter coding modes for the mode decisions (e.g., from mode prediction unit 10). The input data may be stored in a frame memory unit 18, which may be the same or separate from temporary storage 14 and, which may be integral, attached, or directly accessible to encoder unit 6.

A coding mode selection unit 20 may retrieve the intra or inter coding mode selected for each data block or macro block from frame memory unit 18 and, if an intra mode is selected, mode prediction unit 10 may generate a prediction block by extrapolating already encoded pixels adjacent to the current data block in the selected intra coding mode direction. If an inter coding mode is selected, the prediction block may already be generated during step (a) of the mode decision operations.

An arithmetic logic unit (ALU) 24 may retrieve the current data block from frame memory unit 18 and the corresponding prediction block from mode prediction unit 10 and, if an intra mode is selected, generate the residual data block to be the difference therebetween. If an inter coding mode is selected, the residual data block may already be generated during step (b) of the mode decision operations.

Once a mode is selected and the corresponding prediction block and residual data are generated, encode data unit 26 may generate compressed data that fully defines each original uncompressed data block. The compressed data may be "lossy" (for example, where some data may be lost) or "lossless" (for example, an exact replica of the data where substantially no data is lost). In one embodiment, the original data block may be fully defined by an approximation, for example, the prediction block, and the error of the approximation, for example, the residual data. Since the prediction block is generated by applying a mode direction vector to a pre-designated set of adjacent pixels (for intra encoding) or using a pre-designated set of pixels from a previous frame (for inter encoding), the prediction block may be fully defined by the selected intra or inter mode. Accordingly, the compressed data for each uncompressed data block may include a mode and its corresponding residual data.

In one embodiment, each intra mode in the H.264/AVC standard may be represented, for example, by one to four data bits. For example, only a single bit may be used to indicate that the mode for the currently coded or current block is the same as the mode for the previous block (e.g., designated by a bit value of zero (0) or one (1)). If the mode is different however, an additional three bits may be used (providing $2^3=8$ different values) to indicate the remaining eight of the nine intra coding modes in the H.264/AVC standard. In another embodiment, nine of the $2^4=16$ different values of four bits may each correspond to one of the nine intra 4×4 coding modes in the H.264/AVC standard. One or more bits (for example, three to ten) may represent inter modes. The number of bits may depend on the number or types of inter coding modes identified in the encoded data and/or the type of coding, for example, entropy coding such as variable length coding (VLC) or Context-Based Adaptive Binary Arithmetic Coding (CABAC). Other representations, configurations, and numbers of bits may be used to encode the modes.

The residual data for each data block may also be compressed. Initially, the residual data may be represented as a data block itself (for example, a 4×4 data block defined by the matrix difference between the original and prediction 4×4 data blocks). The residual data block may be compressed, for example, by a discrete cosine transformation (DCT) that defines the coefficients of the residual data block.

Encode data unit 26 may generate encoded output data to encode an image frame or video stream. The encoded output data for a digital image frame may include a string of encoded bits, where each sequential group of bits may encode a data block for a spatially sequential array of pixels in the digital image frame. In one example, each 4×4 pixel array may be represented by, for example, 1-4 bits defining an intra mode, 1-10 bits defining an inter mode and additional bits defining the DCT of the corresponding residual data.

Encoder unit 6 may issue the string of encoded output data to a load/store unit 11, for transferring the compressed data. In one embodiment, load/store unit 11 may transfer the encoded data to storage unit 4 for long-term storage. Alternatively, store unit 11 may transfer the encoded data to temporary storage 14 for further processing, for example, by an execution unit. In another embodiment, load/store unit 11 may transfer the encoded data to output device 102, either directly of via memory controller 3, for example, for transmitting or streaming the data to another device.

To display the video or image data, a decoder unit 16 may convert the compressed encoded data into uncompressed data (decoding), for example, by inverting the operations for encoding. In one embodiment, decoder unit 16 may generate a prediction block by applying the mode transformation function to a pre-designated set of pixels (which were already uncompressed from decoding the previous block), convert the DCT residual data bits into a 4×4 residual data block, and add the prediction block and the residual data block to generate the original uncompressed data block. The uncompressed data block may be displayed in an image frame or video stream on output device 102 (such as, a monitor or screen), for example, via display controller 5. The reconstructed data may be lossless or lossy.

Mode decision unit 7, mode prediction unit 10, and/or decoder unit 16 may be integral to or separate from encoder unit 6 and/or processor 1 and may be operatively connected and controlled thereby. The same or different mode decision unit 7, mode prediction unit 10, and/or decoder unit 16 may be used for intra frame encoding and inter frame encoding. These devices may be internal or external to device 100. Other components or arrangements of components may be used.

Figure 3:
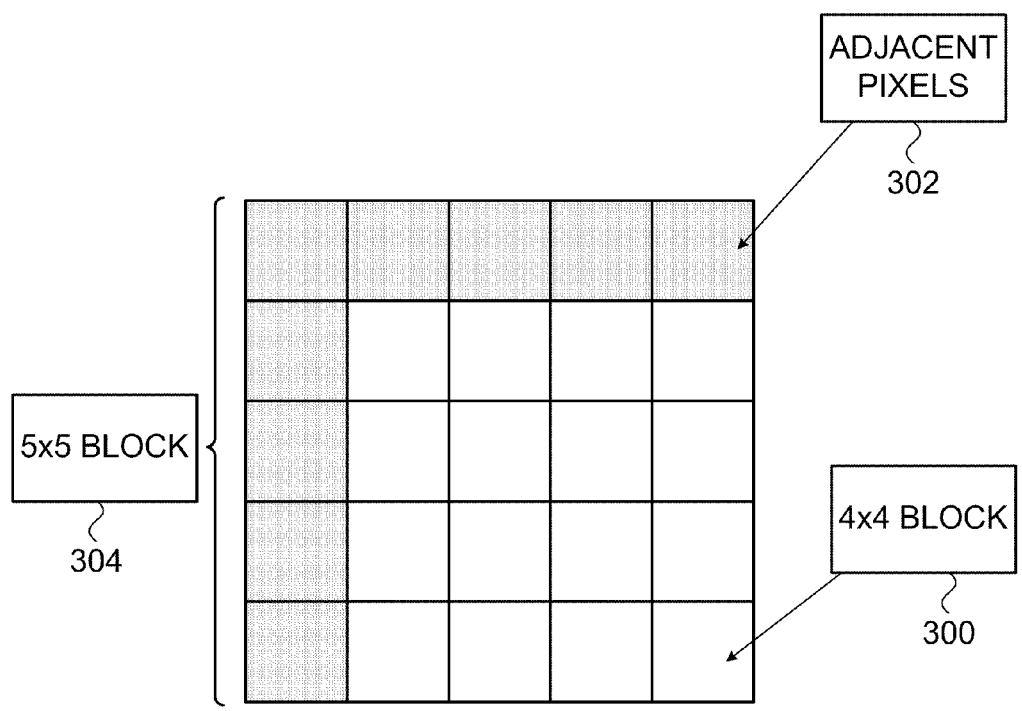
FIG. 3 is a schematic illustration of an exemplary data block to be encoded using an intra coding mode in accordance with embodiments of the invention.

Reference is made to FIG. 3, which is schematic illustration of an exemplary data block 300 to be encoded using an intra coding mode in accordance with embodiments of the invention.

A processor (e.g., processor 1 of FIG. 2A) may receive data block 300 representing video, image, or other digital data. In the example in FIG. 3, data block 300 is a 4×4 data block (for example, representing values for a 4×4 pixel array), although any sized data block may equivalently be used.

For intra frame encoding, the processor may generate a "meta" block 304, which includes data block 300 combined with its adjacent pixel blocks 302. Meta block 304 may be used to generate a prediction block of data block 300 by extrapolating values from adjacent pixel blocks 302. In the example in FIG. 3, meta block 304 is a 5×5 data block (for example, representing values for a 5×5 pixel array), although any sized data block may equivalently be used.

The processor may use adjacent pixel blocks 302 from previously encoded data blocks for intra frame encoding the current data block 300. When adjacent pixel blocks 302 are initially encoded, they may be stored in a temporary storage area (e.g., in temporary storage 14 of FIG. 2A) until they are used to process the current data block 300.

Adjacent pixel blocks 302 may represent pixels adjacent to, neighboring, or within a predetermined pixel length or pixel value difference of, pixels represented by the current data block 300. Adjacent pixels defined by adjacent pixel blocks 302 may be pre-designated in a particular spatial position relative to current pixels represented by the current data block 300. In the example in FIG. 3, adjacent pixel blocks 302 represent pixels above and to the left of pixels represented by the current data block 300. In this example, adjacent pixel blocks 302 may be taken from three previously encoded data blocks, for example, the data blocks above, to the left and diagonally to the upper-left. Alternatively, adjacent pixel blocks 302 may be taken from a subset of the surrounding data blocks (e.g., only above and to the left) and any intermediate or additional surrounding pixels (e.g., diagonally to the upper-left) may be left out or averaged, duplicated, or derived from other adjacent pixel blocks. It may be appreciated that adjacent pixel blocks 302 may represent any pixels from an area neighboring the current pixels being encoded or from a greater distance if there is sufficiently minimal pixel value change therebetween. The pre-designated area or relative spatial position, the number or dimensions of adjacent pixel blocks 302, the size of the neighborhood or threshold for a degree of permissible pixel value change in a neighborhood may be pre-programmed, changed by a user (for example, to adjust the encoding speed and/or quality), and/or automatically and iteratively adjusted by the processor to maintain a predetermined encoding efficiency.

Figure 4A:
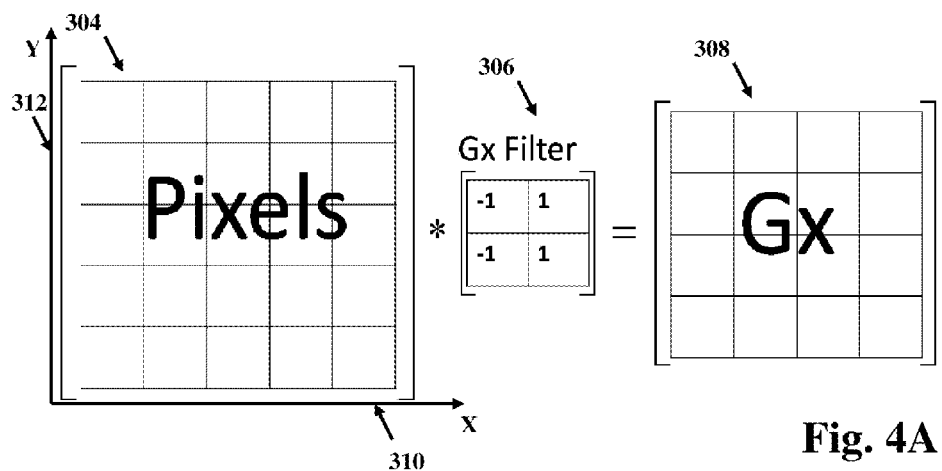
FIGS. 4A and 4B are schematic illustrations of exemplary mechanisms for computing directional pixel value changes in accordance with embodiments of the invention.
Figure 4B:
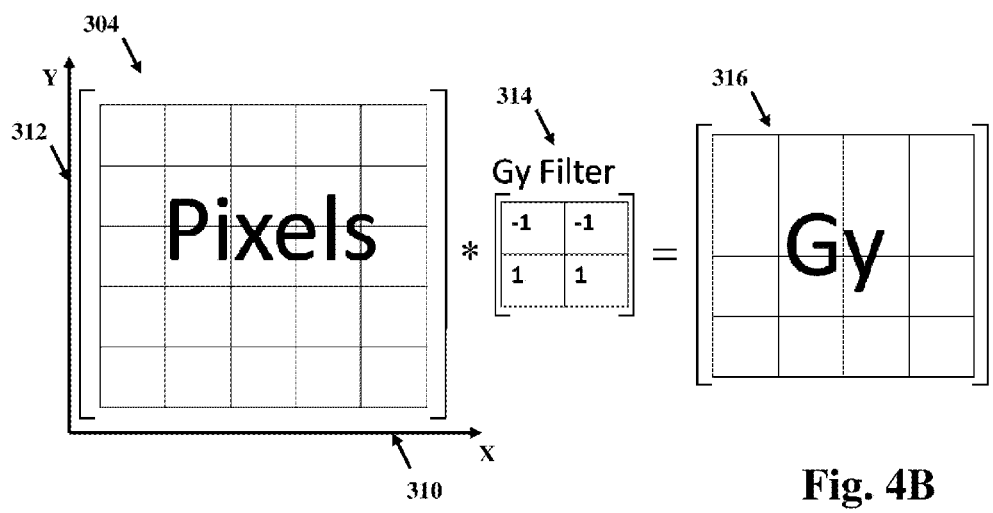

The processor may select a mode with a directionality closest to the direction of minimum pixel value change across meta block 304 (e.g., data block 300 and adjacent pixel blocks 302 combined). The processor may measure the pixel value change in two or more distinct predetermined directions and may combine the changes in the respective predetermined directions (e.g., by vector addition) to determine a direction of pixel change. Any two or more distinct predetermined directions may be used, such as, for example, perpendicular or non-parallel directions or the respective directions of any coordinate system, such as, distance and angle in the polar coordinate system. The accuracy of pixel value change calculations may be increased by increasing the number of predetermined directions along which the pixel value changes are measured. In FIGS. 4A and 4B, the change may be measured in the "X" and "Y" directions of the Cartesian coordinate system.

Reference is made to FIGS. 4A and 4B, which schematically illustrate exemplary mechanisms for computing pixel value changes in an X direction 310 and a Y direction 312, respectively, in accordance with embodiments of the invention.

In FIG. 4A, to compute the pixel value change in X direction 310, a processor (e.g., processor 1 of FIG. 2A) may apply an X direction gradient filter 306 to meta block 304 to calculate differences in the values of pixels positioned along X direction 310. Applying gradient filter 306 to meta block 304 may generate an X direction gradient block 308 representing the changes in pixel values in X direction 310.

In one example, gradient block 308 may be the convolution of meta block 304 with an X direction gradient filter 306, for example, $$Gx = \begin{bmatrix} -1 & 1 \\ -1 & 1 \end{bmatrix}.$$

In this example, each entry, $b_{i,j}$, of gradient block 308 may correspond to a 2×2 sub-block of meta block 304, $$\begin{bmatrix} a_{i,j} & a_{i,j+1} \\ a_{i+1,j} & a_{i+1,j+1} \end{bmatrix},$$

where $b_{i,j} = [(a_{i,j}) + (a_{i+1,j})] - [(a_{i,j+1}) + (a_{i+1,j+1})]$.

In the following example, values are arbitrarily assigned to meta block 304 for demonstrative purposes.

Meta block 304 is, for example:

$$\begin{bmatrix} 10 & 10 & 10 & 10 & 10 \\ 20 & 20 & 20 & 20 & 20 \\ 30 & 30 & 30 & 30 & 30 \\ 41 & 41 & 42 & 43 & 44 \\ 50 & 52 & 54 & 56 & 58 \end{bmatrix} \quad (2)$$

Applying gradient filter 306, $$\begin{bmatrix} -1 & 1 \\ -1 & 1 \end{bmatrix},$$

to convolve the exemplary meta block 304 in equation (2) generates an X direction gradient block 308, which is:

$$Gx = \begin{bmatrix} 0 & 0 & 0 & 0 \\ 0 & 0 & 0 & 0 \\ 0 & -1 & -1 & -1 \\ -2 & -3 & -3 & -3 \end{bmatrix} \quad (3)$$

Similarly, in FIG. 4B, to compute the pixel value change in Y direction 312, a processor (e.g., processor 1 of FIG. 2A) may apply a Y direction gradient filter 314 to meta block 304 to calculate differences in the values of pixels positioned along Y direction 312. Applying gradient filter 314 to meta block 304 may generate a Y direction 312 gradient block 316 representing the changes in pixel values in Y direction 312.

In one example, gradient block 316 may be the convolution of meta block 304 with a Y direction gradient filter 314, for example, $$Gy = \begin{bmatrix} -1 & -1 \\ 1 & 1 \end{bmatrix}.$$

In this example, each entry, $c_{i,j}$, of gradient block 316 may correspond to a 2×2 sub-block of meta block 304, $$\begin{bmatrix} a_{i,j} & a_{i,j+1} \\ a_{i+1,j} & a_{i+1,j+1} \end{bmatrix},$$

where $c_{i,j} = [(a_{i,j}) + (a_{i,j+1})] - [(a_{i+1,j}) + (a_{i+1,j+1})]$.

Applying gradient filter 306, $$\begin{bmatrix} -1 & 1 \\ -1 & 1 \end{bmatrix},$$

to convolve the exemplary meta block 304 in equation (2) generates a Y direction gradient block 316, which is:

$$Gy = \begin{bmatrix} -20 & -20 & -20 & -20 \\ -20 & -20 & -20 & -20 \\ -22 & -23 & -25 & -27 \\ -20 & -23 & -25 & -27 \end{bmatrix} \quad (4)$$

Once the pixel value changes are calculated for each respective direction (for example, X direction 310 and Y direction 312), the processor may combine these values. X and Y gradient blocks 308 and 316 may be combined, for example, to form a multi-directional gradient block G=[Gx, Gy], where each entry $G_{ij}=(Gx_{ij}, Gy_{ij})$. Combining the exemplary X and Y (2D) gradient blocks 308 and 316 in equations (3) and (4) above generates a multi-directional (3D) gradient block, G, which is:

$$G = [Gx, Gy] = \begin{bmatrix} (0,-20) & (0,-20) & (0,-20) & (0,-20) \\ (0,-20) & (0,-20) & (0,-20) & (0,-20) \\ (0,-22) & (-1,-23) & (-1,-25) & (-1,-27) \\ (-2,-20) & (-3,-23) & (-3,-25) & (-3,-27) \end{bmatrix} \quad (5)$$

The (3D) multi-directional gradient block, G, defines an array of (2D) vectors, each indicating a direction and amplitude of pixel value change across meta block 304. A scaled version of the vector array is shown in FIG. 5.

Figure 5:
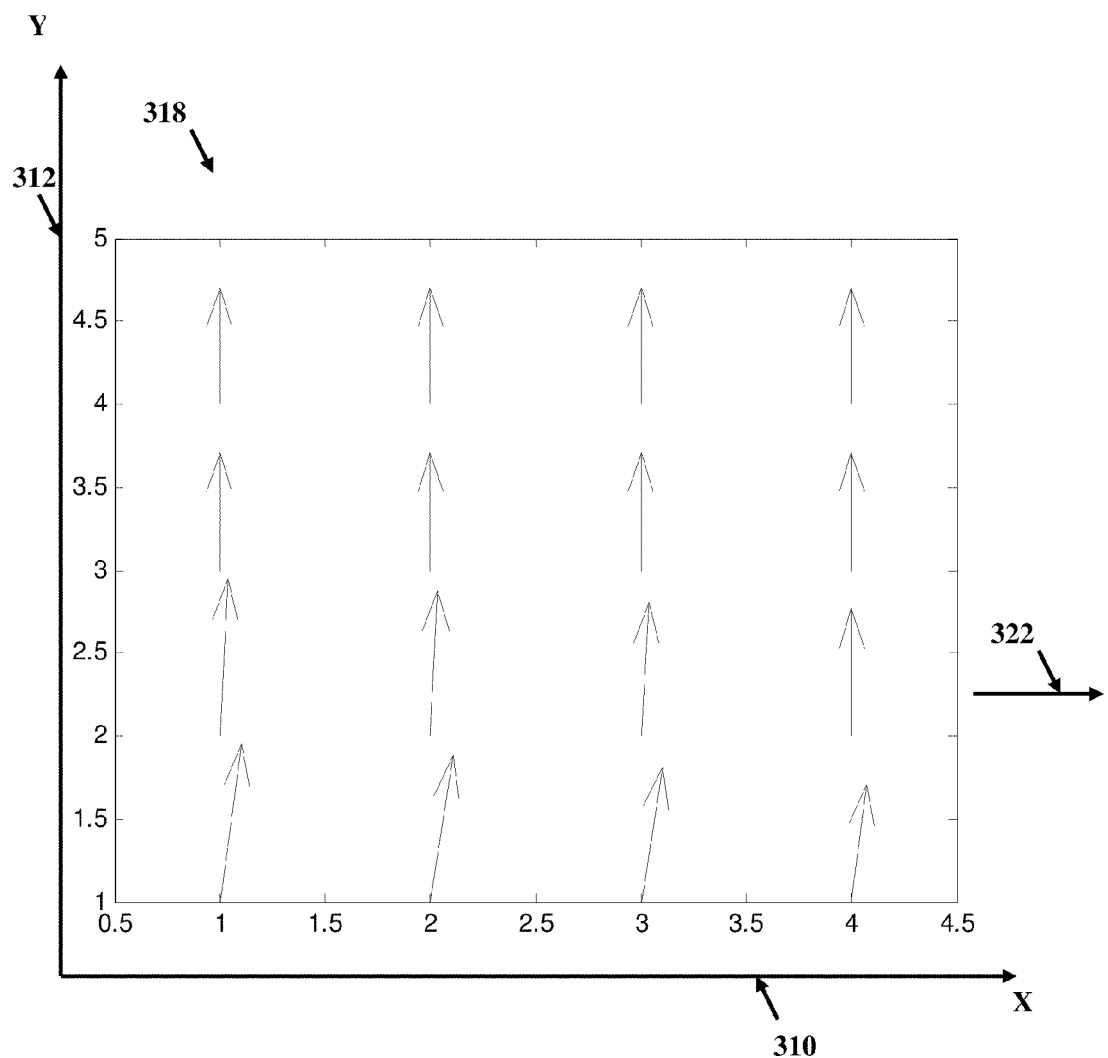
FIG. 5 is a schematic illustration of an exemplary vector field of the pixel value changes between a data block and adjacent pixels block in accordance with embodiments of the invention.

Reference is made to FIG. 5, which schematically illustrates an exemplary vector field of the pixel value changes 318 across meta block 304, in accordance with embodiments of the invention.

A direction of minimum pixel value change 322 may be perpendicular to the vector field of pixel values changes 318. In the example shown in FIG. 5, the vector field of pixel value changes 318 is predominantly oriented in Y direction 312. Accordingly, the direction of minimum pixel value change 322 may be in X direction 310.

The processor may select an intra coding mode with a corresponding vector direction closest to the direction of minimum pixel value change 322 and therefore, perpendicular to the vector field of pixel value changes 318.

To determine the perpendicular direction, scalar products may be used. A scalar product between two vectors is maximal when the vectors are parallel and minimal when the vectors are perpendicular. Accordingly, to determine the optimal mode direction (for example, the mode direction that is most perpendicular to the vector field of pixel values changes 318) the processor may compute the scalar product of each mode direction vector (e.g., shown in FIG. 1A) and the vector field of pixel values changes 318. The scalar product giving a minimal value may correspond to the most perpendicular, and therefore, most optimal, mode direction. This scalar product for each mode may be referred to as the "energy" of the mode, $E_{mode}$.

In the example in FIG. 1A, the eight directional mode vectors may be represented as eight unit or direction vectors, "$dir_{vec(Mode)}$," for example, as follows:

$dir_{vec(Mode)}=$

[0,1] // Mode 0 (Y direction 312)

[sin(1*pi/8),cos(1*pi/8)]; // Mode 7

[sin(2*pi/8),cos(2*pi/8)]; // Mode 3 (positive X direction 310; positive Y direction 312)

[sin(3*pi/8),cos(3*pi/8)]; // Mode 8

[sin(4*pi/8),cos(4*pi/8)]; // Mode 1 (X direction 310)

[sin(5*pi/8),cos(5*pi/8)]; // Mode 6

[sin(6*pi/8),cos(6*pi/8)]; // Mode 4 (positive X direction 310; negative Y direction 312)

[sin(7*pi/8),cos(7*pi/8)], // Mode 5 (6)

where each sequential mode direction vector differs by an angle of $$22\frac{1}{2}$$

degrees, and together the mode vectors span 180°. Other directions and angles may be used.

The "energy" for the each mode, $E_{mode}$, may be computed, for example, as:

$$E_{mode} = \Sigma[(abs(G)) \cdot dir_{vec(mode)}], \quad (7)$$

where $dir_{vec(Mode)}$ is the direction vector for each respective mode. Using the exemplary values of $dir_{vec(Mode)}$ in equations (6) and the multi-directional gradient block, G, defined in equation (5), the energy for each mode defined in equation (7) is, for example:

$E_0$=352.0000 // Mode 0 (Y direction 312)

$E_7$=330.5632 // Mode 7

$E_3$=258.8011 // Mode 3 (positive X direction 310; positive Y direction 312)

$E_8$=147.6389 // Mode 8

$E_1$=14.0000 // Mode 1 (X direction 310)

$E_6$=121.7703 // Mode 6

$E_4$=239.0021 // Mode 4 (positive X direction 310; negative Y direction 312)

$E_5$=319.8480 // Mode 5 (8)

Other energy values may be used.

The processor may compare the energy calculated for each mode. The mode direction vector that generates the smallest "energy" or scalar product is most perpendicular to the vector field of pixel values changes 318 and therefore closest to the direction of minimum pixel value change 322. This mode is the optimal directional mode for providing the most accurate approximation of data block 300. For the exemplary values given in equation (8), mode 1 (purely horizontal, X direction 310) has the smallest energy (14.0000) of all the modes and is therefore the optimal directional mode in this example.

If only directional modes are used, the optimal directional mode may be automatically selected for encoding data block 300. However, some systems may use non-directional modes. A non-directional mode may be any mode that does not extrapolate adjacent pixel blocks 302 in a specific direction. For example, "DC" mode (2) shown in FIG. 1B is a non-directional mode that extrapolates prediction block by averaging the values of adjacent pixel blocks 302 (e.g., see Mode 2: DC of "Pixel Extrapolation" diagram of FIG. 1B).

Non-directional modes may be chosen over even the most accurate of the directional modes, for example, when there is no dominant or significant directionality of pixel value change across meta block 304. In another embodiment, encoding with non-directional modes may be significantly less computationally intensive than with directional modes, and therefore, even when there is a dominant or significant directionality of pixel change, if the directional amplitude is below a predetermined threshold, the non-directional modes may still be chosen.

The processor may evaluate the benefit of using the optimal directional mode over the other directional modes. If the benefit in insignificant or below a predetermined value, the processor may select a non-directional mode for encoding data block 300.

In one embodiment, the processor may select the optimal directional mode over the non-directional mode if the energy of the optimal directional mode is less than the sum of the energies of all other modes, $$E_{mode_{Total}} = \sum_{i=0}^{8} E_{mod_i},$$

divided by a scaling factor, a. For example, the processor may select the optimal directional mode, if:

$$E_1(mode_1 chosen) < [(E)]_1(mode_1 total)/a)) \quad (9)$$

Otherwise, the processor may select a non-directional mode.

The scaling factor "a" may be adjusted to fine-tune the preference between the optimal directional mode and non-directional modes. The larger the scaling factor, the smaller the allowable energy of the directional mode and the greater the preference for selecting a non-directional mode. The scaling factor may be at least equal to the number of modes being summed so that equation (9) requires that the optimal directional mode has less than the average mode energy.

For the exemplary values given in equation (8), and for a scaling factor a=8, equation (9) requires that $$E_1 < \left(\frac{sum(E)}{8}\right);$$

which is satisfied in this example. Therefore, the optimal directional mode (1) is selected over the non-directional mode (2).

Once the intra coding mode is selected for encoding one or more data blocks 300, the processor may predict the residual data for the data blocks 300. The residual data may be based on the selected "energy" or $E_{mode}$ for each data block 300 defining the difference (or prediction error) between the direction of minimum pixel value change and the selected intra coding mode direction (the closest available coding direction to the direction of minimum pixel value change). The processor may combine the $E_{mode}$ or prediction error of each of the data blocks in a set of data blocks 300 (for example, forming a macro blocks) to calculate the predicted residual data, $PRD_{Intra}$, for the cumulative set of data blocks 300 since each inter coding mode is often evaluated for an entire set or macro block of data blocks 300.

The predicted residual data, $PRD_{Intra}$, for intra frame coding may be, for example:

$$PRD_{Intra} = \left(\sum_n Emode(min)_n\right) * (p) + (q), \quad (10)$$

where (Emode(min)$_n$) is the minimum E$_{mode}$ for encoding the (n$^{th}$) data block (using the selected intra coding mode) and parameters (p) and (q) are scalar values defining a linear (first order) relationship between (Emode(min)$_n$) and the residual data of encoding. Equation (10) parallels equation (1) and may use the same parameters (p) and (q). In one embodiment, (n)=(16) sub-macro (4×4) data blocks may be used and the predicted residual data, PRD$_{Intra}$, may be the sum of the (16) minimum E$_{mode}$ values for the (16) respective data blocks. For example, for the single data block 300 of FIG. 3, a minimum E$_{mode}$ value, (E$_1$)=(14.0000), may be used as evaluated in equation (8).

Figure 6:
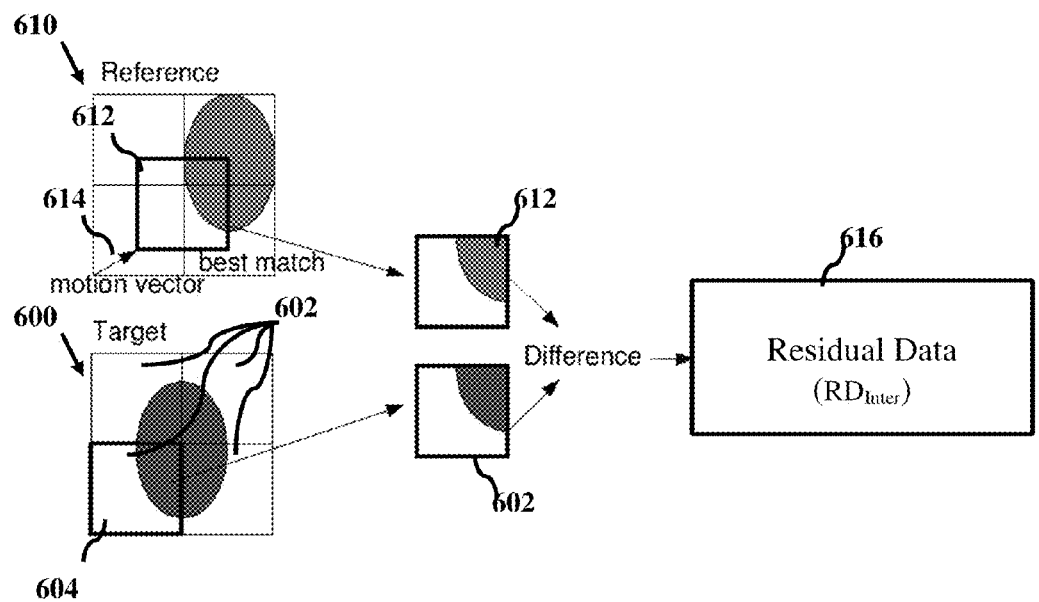
FIG. 6 is a schematic illustration of an exemplary frame including a macro block to be encoded using an inter coding mode in accordance with embodiments of the invention.

Reference is made to FIG. 6, which is schematic illustration of a current frame 600 including a macro blocks 604 to be encoded using an inter coding mode in accordance with embodiments of the invention.

Current frame 600 may be partitioned into a plurality of macro blocks 602 (for example, (4) (16×16) macro block are shown, although any number and size of macro blocks may be used). Each macro blocks 602 may include a plurality of sub-macro blocks (for example, (16) sub-macro (4×4) data blocks 300 of FIG. 3).

A processor (e.g., processor 1 of FIG. 2A) may use a block matching mechanism to find a prediction block 612 of a previously encoded (reference) frame 610 that is substantially similar to the macro block 604 currently being encoded (for example, above a predetermined similarity threshold or more similar than other reference blocks). The processor may encode macro blocks 604 by a (motion) vector 614 pointing from a predetermined coordinate associated with (the position) of the macro blocks 604 to the position of the matching block 612. The processor may use a null vector or no vector when the macro block 604 and the prediction block 612 have the same coordinates in their respective frames 600 and 610.

The processor may generate a residual data block 616, RD$_{Inter}$, for inter frame coding by computing the difference between macro block 604 from current frame 600 and its prediction block 612 from the previously encoded reference frame 610. Residual data block 616 may be compressed, for example, by a discrete cosine transformation (DCT) that defines the coefficients of the residual data block 616.

Alternatively, inter frame residual data block 616 may be predicted or estimated. In one embodiment, inter frame residual data block 616 may be predicted by measuring and comparing the Emodes (for each directional intra coding modes) of each of macro block 604 and matching block 612. In one embodiment, the predicted inter frame residual data may be the sum of the minimum Emodes (of the intra coding mode with a direction closest to the direction of minimal pixel change) of macro block 604 and matching block 612. The predicted inter frame residual data may be, for example:

$$PRD_{Inter}=(Emode(min)_{current}+Emode(min)_{ref})* (m)+(n) \quad (11)$$

where (Emode(min)$_{current}$) and (Emode(min)$_{ref}$) are the minimum E$_{mode}$ for encoding the current macro block 604 and matching block 612, respectively, and parameters (m) and (n) are scalar values defining a linear (first order) relationship between (Emode(min)$_{current}$)+(Emode(min)$_{ref}$) and the inter frame residual data block 616. In an alternate embodiment, the predicted inter frame residual data may be the scaled difference between the minimum Emodes of macro block 604 and matching block 612, for example:

$$PRD_{Inter}=(Emode(min)_{current}-Emode(min)_{ref})* (g)+(h) \quad (12),$$

where parameters (g) and (h) (for example, different from (m) and (n)) define a linear relationship between (Emode(min)$_{current}$)−(Emode(min)$_{ref}$) and the inter frame residual data block 616.

Once the predicted residual data for intra frame coding, PRD$_{Intra}$, and the measured residual data for inter frame coding, RD$_{Inter}$, is generated (for example, for each macro block) the processor may compare the inter and intra modes and select the mode with the least error or smallest residual data associated therewith. If PRD$_{Intra}$ is smaller than RD$_{Inter}$, the processor may encode the macro block with intra coding modes, where each data block in the macro block may be individually encoded with the optimal intra coding mode for that block (for example, the mode with a direction closest to the direction of minimum pixel value change and/or having the smallest E$_{mode}$). However, if PRD$_{Intra}$ is greater than RD$_{Inter}$, the processor may select the (optimal) inter coding mode to encode the macro block.

If an intra mode is selected, the processor may send the selected intra mode to the mode prediction unit (e.g., mode prediction unit 10 of FIGS. 2A and 2B) to generate a prediction block and actual residual data using the corresponding mode (only the predicted residual data has been generated). If an inter coding mode is selected, the prediction block may already be generated during the mode decision operations. In general, where either intra or inter coding residual data may be measured (using prediction blocks) or predicted (without using prediction blocks), the mode prediction unit may generate a prediction block and compute the actual measured residual data thereof for the encoding modes for which predicted (and not measured) residual data has been generated.

The processor may send the selected inter or intra mode and associated actual residual data to the encoder unit (e.g., encoder unit 6 of FIGS. 2A and 2B), where the residual data and/or mode may be further compressed for encoding the data block as a string of data bits. Alternatively, the compressed data may include predicted residual data instead of actual residual data.

This process may be repeated for each block in a macro block and each macro block in an image frame or video stream. During compression, or alternatively, only after an entire image frame or video stream is compressed, the encoder unit may issue the compressed data to a load/store unit (e.g., load/store unit 11 of FIG. 2A) for transferring, for example, for storage (e.g., in storage unit 4 or temporary storage 14 of FIG. 2A) or to an output device (e.g., output device 102 of FIG. 2A) for transmitting or streaming the data to another device, system, network.

A decoder (e.g., decoder unit 16 of FIG. 2A) may retrieve the compressed data from storage and convert the data into uncompressed data. The uncompressed image frame or video stream may be displayed on output device (for example, output device 102 of FIG. 2A, such as a monitor or screen). Other operations or series of operations may be used, and the exact set of operations shown above may be varied.

Figure 7:
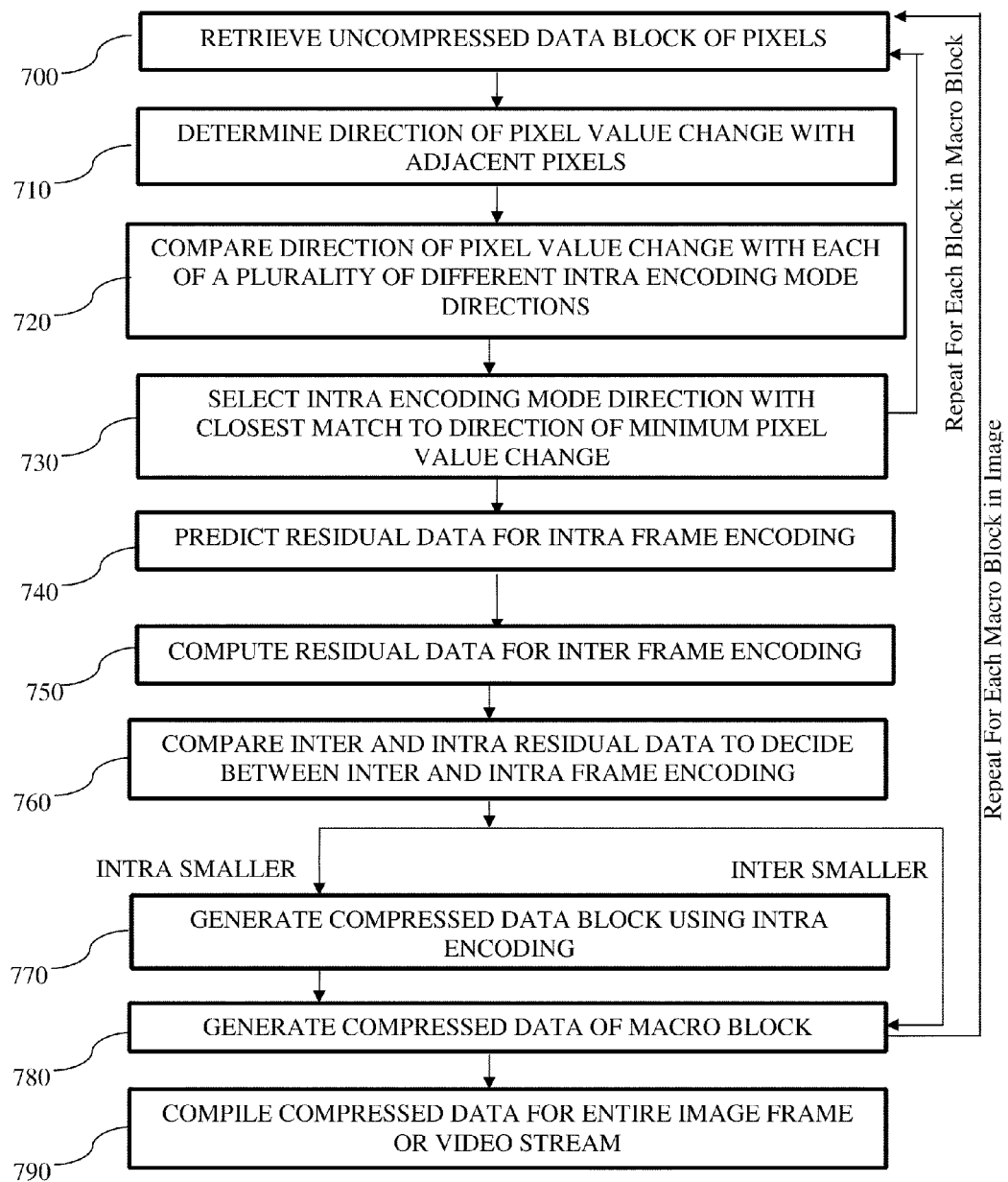
FIG. 7 is a flowchart of a method for encoding a data block of digital data in accordance with embodiments of the invention.

Reference is made to FIG. 7, which is a flowchart of a method implemented in a computing device for encoding digital data, in accordance with embodiments of the invention.

In operation 700, a processor (for example, processor 1 of FIG. 2A) may retrieve an uncompressed data block (e.g., data block 300 of FIG. 3) from the data memory unit (for example, data memory unit 2 of FIG. 2A), for example, using a fetch unit (for example, fetch unit 12 of FIG. 2A). The uncompressed data block may define values for a set of pixels in video or image data. For example, the data block may be a (4×4) entry data block defining values for a (4×4) pixel array in an image frame or video stream.

In operation 710, a mode decision unit (for example, mode decision unit 7 of FIG. 2A) may determine one or more direction(s) of pixel value change in the data block relative to adjacent data blocks (for example, adjacent pixel blocks 302 of FIG. 3). The adjacent data block may represent values for a set of adjacent pixels that are already encoded or compressed by intra frame encoding in a previous iteration of operations 700-750. The direction of change in pixel values may include a vector field (for example, vector field of pixel value changes 318 of FIG. 3) defining the direction of change for each entry of the data block relative to surrounding entries (for example, a surrounding or overlapping (2×2) sub-block). Alternatively, the direction may be an approximation, average, medium, or mode, direction of (maximum or minimum) pixel value change. The direction(s) of change in pixel values may be determined by measuring pixel value changes between the data block and adjacent pixel blocks in two or more distinct or non-parallel directions. The direction of pixel value change may be defined by the vector sums of the respective non-parallel measurements.

In operation 720, the mode decision unit may compare the direction of pixel value change determined in operation 710 with each of a plurality of predefined different intra coding mode directions (for example, shown in FIG. 1A).

In operation 730, the mode decision unit may select the intra coding mode direction that most closely matches the direction of minimum pixel value change. The direction of minimum pixel value change has the most constant pixel values and in the optimal direction for copying or extrapolating adjacent pixel values. In one embodiment, the mode that is most perpendicular to (for example, having the smallest scalar product with) the one or more direction(s) of pixel value change most closely matches the direction of minimum pixel value change.

The processor may repeat operations 700-730 for the next sequential uncompressed data block in the image, for example, until an entire macro block is processed.

In operation 740, the mode decision unit may predict residual data for intra frame encoding. The predicted residual data may be a function the minimum "energy" or $E_{mode}$ of the selected intra coding mode for each block (as shown in equation (10)) or the difference (or prediction error) between the direction of minimum pixel value change and the selected intra coding mode direction (as shown in equation (1)). As shown by experimentation, there is a substantially linear (first order) relationship between the minimum $E_{mode}$ and the actual residual data generated using the intra frame mode associated with the minimum $E_{mode}$. Accordingly, the minimum $E_{mode}$ provides a good approximation of the actual residual data and is therefore used to compute the predicted residual data.

In some embodiments, the processor may generate the predicted residual data, $PRD_{Intra}$, to include a sum of the $E_{modes}$ for a plurality of data blocks forming a whole macro block. In such embodiments, the processor may compare the intra mode predicted residual data, $PRD_{Intra}$, with the inter mode residual data, $RD_{Inter}$, generally evaluated for an entire macro block.

In operation 750, the processor or mode decision unit may compute residual data for inter frame encoding. For a macro block (e.g., macro block 604 of FIG. 6) including the uncompressed data block (e.g., data block 300 of FIG. 3) retrieved in operation 700, the processor may find a block of a previously encoded reference frame (e.g., reference frame 610 of FIG. 6) that is substantially similar to the macro blocks. The processor may compute the residual data, for example, as the difference between the macro block of the current being encoded and the matching block (e.g., prediction block 612 of FIG. 6) from the previously encoded reference frame. Alternatively, the mode decision unit may generate the predicted inter coding residual data, $PRD_{Inter}$, (e.g., without generating prediction block 612 of FIG. 6), for example, according to equation (11).

In operation 760, the processor may compare the predicted residual data for intra frame encoding, $PRD_{Intra}$, (generated in operation 740) and the actual residual data, $RD_{Inter}$, or the predicted residual data, $PRD_{Inter}$, for inter frame encoding (generated in operation 750) to select an inter or intra frame mode to encode the data block in operation 700 and/or its macro block in operation 750.

If $PRD_{Intra}$ is smaller than $RD_{Inter}$ (or $PRD_{Inter}$), the processor may select intra frame encoding and may proceed to operation 770 (to generate actual intra frame residual data); if $PRD_{Intra}$ is greater than $RD_{Inter}$ (or $PRD_{Inter}$) the processor may select inter frame encoding. The processor may proceed to operation 770 unless inter frame encoding is selected and the actual inter frame residual data, $RD_{Inter}$, was already generated in operation 750, in which case the processor may skip operation 770 and proceed to operation 780.

In operation 770, the processor may generate a prediction block by extrapolating already encoded pixel values. The mode prediction unit may calculate the actual residual data between the generated prediction block and the original uncompressed data block. The mode prediction unit may send the selected mode and residual data to an encoder unit.

In operation 780, an encoder unit (e.g., encoder unit 6 of FIGS. 2A and 2B) may generate compressed data defining the data block or macro block. The compressed data may include a string of bits defining the selected inter or intra mode (for example, as 1-4 bits) and the residual data computed therefore (for example, as a DCT that defines the coefficients of the residual data block).

The processor may repeat operations 700-770 for the next sequential macro block in the image frame or video stream.

In operation 790, the encoder unit may compile the compressed data for the entire image frame or video stream, for example, as a string of encoded bits. The encoder unit may issue the encoded bits piece-wise or together to a load/store unit (e.g., load/store unit 11 of FIG. 2A) for transferring the image frame or video stream, for example, for storage, transfer to another device, system, network, or display in an output device.

It may be appreciated that mode decision unit and mode prediction unit may be integral to or separate from the encoder unit and/or the processor and may be operatively connected and controlled thereby. Other operations or series of operations may be used, and the exact set of operations shown above may be varied.

In some embodiments, intra encoding modes may define a predetermined direction or a predetermined pattern (for non-directional modes) in which already encoded adjacent pixels are extrapolated, as shown in FIG. 1B. In some embodiments, inter encoding modes may define, for example, an absolute or relative direction, location, or index of or between, one or more reference blocks from a previously encoded reference frame and a current data block in a different frame to be encoded. In one embodiment, each inter encoding mode may indicate a different reference frame. For example, there are

(16) or (32) reference frames and fields used in the H.264/AVC standard defining (16) or (32) inter encoding modes, respectively. In some embodiments, the inter encoding modes may define the type of reference frame used to decode the current frame, for example, P-frames (use a single previous frames as reference for the current frame) or B-frames (or bi-directional frames use both previous and subsequent frames as the references frames, copying some elements from each frame). In some embodiments, the inter encoding modes may define switchable SP-frame/slices mode or switchable SI-modes for switching between encoding each frame together and encoding slices or sub-regions of the frame using different reference frames (for example, I-frames or intra coded frames may be used for the SI-mode and both I-frames and P-frames may be used for the SP-mode). The inter-mode may also define one of a plurality of directions for inter frames modes (for example, vertical, horizontal, or any direction) defining the direction of the motion vector (for example, vector 614 of FIG. 6) defining the relative directional of spatial change of a current block in a current frame and the region of the matching block in a reference frame. The inter-mode may further define a Skip and Direct Mode, in which the current block is encoded without residual error or motion vectors, such that the decoder may deduce the motion vector of the data block from other already decoded blocks. In some embodiment, inter encoding "modes" may define the sizes of data blocks or macro-block partitions (for example, 4×4, 4×8, 8×4, 8×8, 8×16, 16×8, 16×16, etc.) and/or sub-partitions (for example, if an initial partition generates 8×8 data blocks, a sub-partition may generate 4×8, 8×4, or 4×4 data blocks). Increasing the size of the data blocks may decrease the accuracy of encoding, but may also increase the data reduction or volume of data compression. The encoder may select the size or "mode" of the data blocks that balances the benefit of decreased data volume with the detriment of decreased accuracy. Other numbers or types of inter or intra frame encoding modes may be used.

Although 4×4 data blocks (representing values for a 4×4 pixel array) are described herein, it may be appreciated to persons skilled in the art that data blocks having any dimensions, for example, including 4×8, 8×4, 4×16, 8×16, 16×16, . . . data blocks, a one-dimensional string of data bits, or three-dimensional data arrays, may be used interchangeably according to embodiments of the invention. Although the size of the data blocks may affect the quality of encoding (for example, smaller blocks may provide better compression quality), the size of the data blocks generally does not affect the process by which the blocks are encoded.

Although embodiments of the invention describe data blocks representing values of an array or block of pixels, neither the data blocks nor the pixel blocks need be arranged in a block or array format. For example, the pixel arrays and data blocks may be stored in a memory or storage device in any configuration such as a string of values.

Although embodiments of the invention are directed to encoding uncompressed data, it may be appreciated by persons skilled in the art that these mechanisms may be operated, for example, in a reverse order, to decode compressed data.

Although embodiments of the invention are directed to encoding video or image data, it may be appreciated by persons skilled in the art that any data having the same or similar digital structure but pertaining to different data types may be used. For example, audio data, graphic data, multimedia data, or any multi-dimensional data may be used.

It may be appreciated that although the term "prediction" is used for prediction blocks and predicted residual data, the meaning of prediction in these contexts may be different. For a prediction block, "prediction" may refer to an actual generated data block that is an approximate or closest representation of another data block. For predicted residual data, "prediction" may mean an estimation of a data block that is not actually generated. It is known through experimentation that, if the actual data block were to be generated, the predicted residual data and the actual residual data would be related (for example, by a linear relationship). Furthermore, predicted residual data is not the residual data computed for a prediction block, but instead an estimated value associated with a prediction block without actually generating the prediction block or measuring values thereof.

Embodiments of the invention may include an article such as a computer or processor readable medium, or a computer or processor storage medium, such as for example a memory, a disk drive, or a USB flash memory, encoding, including or storing instructions which when executed by a processor or controller (for example, processor 1 of FIG. 2A), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method implemented in a computing device for encoding a data block of digital data, the method comprising:
   receiving an uncompressed data block defining values for a set of pixels;
   selecting one of a plurality of intra frame encoding modes each having a different direction for extrapolating already encoded pixels adjacent to the data block, by:
   computing two or more direction gradient blocks, each representing changes in pixel values in a respective direction, wherein computing comprises applying a gradient filter in the respective direction to the set of pixels and a set of adjacent pixels which belong to one or more previously encoded data blocks;
   generating a 3D multi-directional gradient block by combining the two or more direction gradient blocks;
   calculating directional energy values of the data block, the values being associated with each of a predefined plurality of different mode directions, by, for each of the directional energy values, computing a scalar product of a mode direction vector and a vector of pixel value changes from the 3D multi-directional gradient block; and
   selecting a mode direction that is associated with a direction of minimum pixel value change by selecting a minimal directional energy value;
   computing a predicted intra frame encoding residual data for the data block associated with the selected mode based on the minimal directional energy value;
   computing inter frame encoding residual data for the data block associated with the difference between the pixel values of the data block in a current frame and one or more already encoded data blocks in one or more different reference frames;
   comparing the predicted intra frame encoding and inter frame encoding residual data; and
   compressing the data block using intra frame encoding or inter frame encoding having the smaller residual data.

2. The method of claim 1, wherein the inter frame encoding residual data is measured residual data computed by generating a prediction block using the one or more already encoded data blocks in the reference frames and measuring the differences between the prediction block and the uncompressed data block.

3. The method of claim 2, wherein the measured data is a measurement of a sum of absolute differences between the prediction block and the uncompressed data block.

4. The method of claim 1, wherein the predicted intra frame encoding residual data is computed as a linear interpolation of the minimal directional energy value.

5. The method of claim 1, wherein the inter frame encoding residual data is predicted to provide an estimation of differences between a prediction block associated with inter frame encoding and the uncompressed data block and is computed without generating the prediction block.

6. The method of claim 1, wherein the intra frame and inter frame residual data is computed for a macro block containing the data block and computing the predicted intra frame residual data comprises combining the values for the minimal directional energy value for each data block in the macro block.

7. The method of claim 6, wherein the predicted intra frame encoding residual data is computed as a linear interpolation of the combination of the values for the minimal directional energy value-for each data block in the macro block.

8. The method of claim 1, comprising:
converting the compressed data block into uncompressed data of an image frame or video stream; and
displaying the image frame or video stream.

9. A processor for encoding a data block of digital data, the processor is configured to:
select an intra coding mode from among a plurality of intra frame encoding modes each having a different direction for extrapolating already encoded pixels adjacent to the data block, by:
computing two or more direction gradient blocks, each representing changes in pixel values in a respective direction, wherein computing comprises applying a gradient filter in the respective direction to the set of pixels and a set of adjacent pixels which belong to one or more previously encoded data blocks;
generating a 3D multi-directional gradient block by combining the two or more direction gradient blocks;
calculating directional energy values of the data block, the values being associated with each of a predefined plurality of different mode directions, by, for each of the directional energy values, computing a scalar product of a mode direction vector and a vector of pixel value changes from the 3D multi-directional gradient block; and
selecting a mode direction that is associated with a direction of minimum pixel value change by selecting a minimal directional energy value:
compute a predicted intra frame encoding residual data for the data block associated with the selected mode based on the minimal directional energy value,
compute inter frame encoding residual data for the data block associated with the difference between the pixel values of the data block in a current frame and one or more already encoded data blocks in one or more different reference frames,
compare the intra frame encoding and inter frame encoding residual data, and
compress the data block using intra frame encoding or inter frame encoding having the smaller residual data.

10. The processor of claim 9, wherein the processor generates a prediction block using the one or more already encoded data blocks in the reference frames and measures the differences between the prediction block and the uncompressed data block to compute the inter frame encoding residual data.

11. The processor of claim 10, wherein the processor measures the differences to be a sum of absolute differences between the prediction block and the uncompressed data block.

12. The processor of claim 9, wherein the processor computes the predicted intra frame encoding residual data as a linear function of the minimal directional energy value.

13. The processor of claim 9, wherein the processor computes a predicted inter frame encoding residual data to provide an estimation of differences between a prediction block associated with inter frame encoding and the uncompressed data block and does not generate a prediction block to compute the inter frame encoding residual data.

14. A system for encoding a data block of digital data, the system comprising:
a mode decision unit to:
select an intra coding mode from among a plurality of intra frame encoding modes each having a different direction for extrapolating already encoded pixels adjacent to the data block, by:
computing two or more direction gradient blocks, each representing changes in pixel values in a respective direction, wherein computing comprises applying a gradient filter in the respective direction to the set of pixels and a set of adjacent pixels which belong to one or more previously encoded data blocks;
generating a 3D multi-directional gradient block by combining the two or more direction gradient blocks;
calculating directional energy values of the data block, the values being associated with each of a predefined plurality of different mode directions, by, for each of the directional energy values, computing a scalar product of a mode direction vector and a vector of pixel value changes from the 3D multi-directional gradient block; and
selecting a mode direction that is associated with a direction of minimum pixel value change by selecting a minimal directional energy value;
compute a predicted intra frame encoding residual data for the data block associated with the selected mode based on the minimal directional energy value,
compute inter frame encoding residual data for the data block associated with the difference between the pixel values of the data block in a current frame and one or more already encoded data blocks in one or more different reference frames,
compare the intra frame encoding and inter frame encoding residual data, and
compress the data block using intra frame encoding or inter frame encoding having the smaller residual data; and
a processor to compress the data block using intra frame encoding or inter frame encoding having the smaller residual data.

15. The system of claim 14, wherein the mode decision unit generates a prediction block using the one or more already encoded data blocks in the reference frames and measures the differences between the prediction block and the uncompressed data block to compute the inter frame encoding residual data.

16. The system of claim 15, wherein the mode decision unit measures the differences to be a sum of absolute differences between the prediction block and the uncompressed data block.

17. The system of claim 14, wherein the mode decision unit computes the predicted intra frame encoding residual data as a linear interpolation of the minimal directional energy value.

18. The system of claim 14, wherein the mode decision unit computes a predicted inter frame encoding residual data to provide an estimation of differences between a prediction block associated with inter frame encoding and the uncompressed data block and does not generate a prediction block to compute the inter frame encoding residual data.

19. The system of claim 14, comprising:
- a decoder to convert the compressed data block into uncompressed data of an image frame or video stream; and
- a display to display the image frame or video stream.

20. The method of claim 1, wherein the inter frame encoding residual data is computed as a linear interpolation of a value selected from the list consisting of: a sum of the minimal directional energy value of the data block and of a matching block of a previously encoded frame and a difference between the minimal directional energy value of the data block and of a matching block of a previously encoded frame.

* * * * *